United States Patent [19]

Phillips et al.

[11] 3,891,994

[45] June 24, 1975

[54] COLOUR TELEVISION

[75] Inventors: Geoffrey John Phillips, London; John Philip Chambers, Crawley, both of England

[73] Assignees: The Marconi Company Limited; Standard Telephones & Cables Limited, both of London, England; part interest to each

[22] Filed: Sept. 12, 1973

[21] Appl. No.: 396,412

[30] Foreign Application Priority Data

Oct. 9, 1972 United Kingdom .............. 46500/72

[52] U.S. Cl. ........................ 358/11; 358/16; 358/37

[51] Int. Cl. ........................ H04n 9/38

[58] Field of Search ......... 178/5.4 P, 5.4 C; 358/16, 358/11, 37

[56] References Cited

UNITED STATES PATENTS

| | | | |
|---|---|---|---|
| 3,384,706 | 5/1968 | Davidse | 178/5.4 C |
| 3,517,116 | 6/1970 | Rennick | 178/5.4 C |
| 3,598,904 | 8/1971 | Foerster | 178/5.4 C |

*Primary Examiner*—Robert L. Richardson
*Attorney, Agent, or Firm*—Kemon, Palmer & Estabrook

[57] ABSTRACT

PAL colour television signals are sampled at a sampling rate which bears a ratio of small integers, e.g. 3, 5/2, to the colour subcarrier frequency, the sampling instants being maintained at points symmetrically disposed in time about the maxima and minima of the U-component of the signal. A previous sample in such a signal or a combination of such samples can be used as a reference in differential coding or a prediction for error concealment overcoming complications caused by the V-axis phase reversal on alternate lines. Similar principles can be applied to conversion between PAL and N.T.S.C. signals.

10 Claims, 6 Drawing Figures

COLOUR TELEVISION

Figure 1:
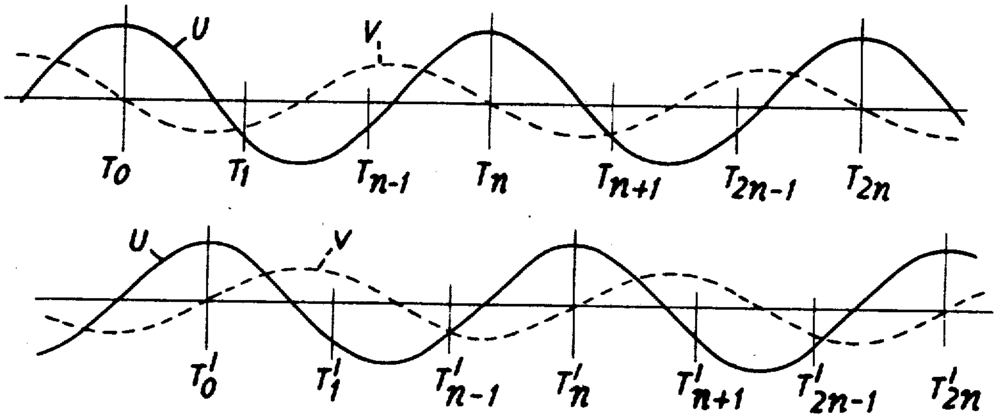

This invention relates to the processing of PAL colour television signals in pulse form, i.e., in the form of digital or analogue samples.

In the transmission, recording or other processing of television signals, it is often desirable to have access at any instant to a previous sample of the signal which has a high probability of being at least approximately equal to the value of the current sample. There are two main instances in which this is needed. When it is probable that a sample is subject to error, it can be preferable to substitute for it the value of a previous sample, in order to reduce the effect that the error would have on the displayed picture. Also, in differential coding in which only the difference between the values of the current sample and of a previous sample is transmitted, rather than the current value itself, it is helpful if the current sample does not differ too much from the previous sample, as the transmission capacity required can then be reduced, or the accuracy of coding increased.

Hitherto the previous sample has generally consisted of one of:

i. the immediately preceding sample,
ii. the sample in substantially the same position on the immediately preceding line,
iii. the sample in substantially the same position on the preceding line but one,
iv. the sample in substantially the same position on a preceding field, and
v. a combination of any of the above.

The previous sample has been provided by using a delay of appropriate length.

However, in the PAL system, the colour subcarrier is modulated differently on alternate lines, so that difficulty can arise when employing methods (ii) or (iv). The composite chrominance signal is formed of two colour signal components modulated onto two quadrature subcarrier components. One of these, the U-component, is fixed in phase, but the phase of the other component, the V-component, is reversed on alternate lines. This reduces the overall probability of there being a relatively small difference between the value of any sample and the value of the sample in the same position on a preceding line.

This invention is concerned with systems in which the sampling rate is related to the colour subcarrier frequency, by a ratio $n/m$ where $n$ and $m$ are both small integers. Commonly $m = 1$. An advantage of such a relationship is that the $n$th previous sample can be used to provide a prediction for error concealment or a reference for differential coding, since samples which are $n$ samples apart will bear the same phase relation to the colour subcarrier, as described in our British Patent Application No. 3618/71, now British Pat. No. 1,313,832.

According to this invention we provide a method of sampling a PAL colour television signal in which the sampling rate bears a ratio of small integers to the colour subcarrier frequency, wherein the sampling instants are maintained at points symmetrically disposed in time about the maxima and minima of the U-component of the signal.

Such a method has particular utility in differential encoding, in error concealment, and in converting a PAL signal to an N.T.S.C. or SECAM signal.

According to this invention we also provide apparatus for processing PAL colour television signals in pulse form, wherein the sampling rate is related to the colour subcarrier frequency by a ratio of small integers, the apparatus comprising means for providing simultaneously with a current sample a previous sample from a corresponding part of a preceding line for which the V-component of the chrominance signal has a relatively reversed phase, the said means being adapted to provide the previous sample which is prevailing at an instant which is separated in time from the maxima and minima of the U-component by an amount equal in amplitude but opposite in sense to the corresponding separation for the current sample.

Normally this will require samples to be taken symmetrically about the zero phase position of the U-component, and preferably sampling instants will occur at the 0° and/or 180° positions relative to the U-component, i.e., at the maxima and/or minima of the U-component. In this case for successive current samples, the previous sample provided will be:

1. an integral multiple of $n$ samples earlier
2. an integral multiple of $n$ samples plus two earlier
3. an integral multiple of $n$ samples plus four earlier
4. an integral multiple of $n$ samples plus six earlier and so on. The integral multiples of $n$ are not necessarily the same for different steps even in the same cycle. The cycle will repeat after $n$ steps, or $n/2$ if $n$ is even.

The invention also provides a method of generating a PAL signal from an N.T.S.C. or SECAM signal, comprising sampling the N.T.S.C. or SECAM signal at a sampling rate which bears a ratio of small integers to the colour subcarrier frequency, the sampling instants being symmetrically disposed about the phase of the B-Y component, and re-ordering the samples to provide a signal of PAL form.

Figure 3:
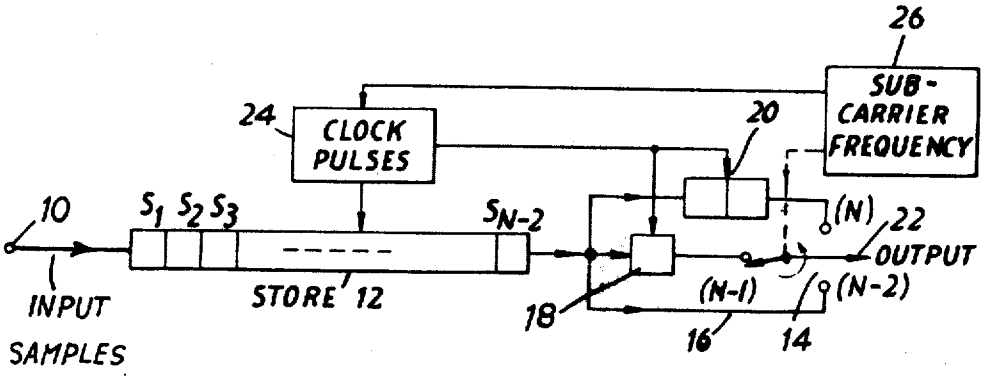

The invention will now be described in more detail, by way of example, with reference to the accompanying drawing, in which:

FIG. 1 illustrates the U and V-components of the chrominance signal of a PAL television signal on two adjacent lines;

FIGS. 2*a* – 2*d* shows phase diagrams for the sampling of a PAL television signal at three different sampling rates; and FIG. 3 is a block circuit diagram of one form of apparatus embodying the invention.

FIG. 1 shows the colour component waveforms U and V for two successive scanned lines in the field over which the luminance and chrominance values are substantially constant. The sampling times are shown as $T_o$, $T_1$, $T_{n-1}$, $T_n$, $T_{n+1}$, $T_{2n-1}$, $T_{2n}$ for the first line with corresponding dashed symbols $T_o'$ etc. for the second line. In the illustrated example $n$ is taken to be 3. The samples at times $T_o$, $T_n$ and $T_{2n}$ occur at the maxima of the U-component, and it can be seen that the amplitudes of the U and V components are similar for the pairs of samples taken at the following times:

| | | | | | |
|---|---|---|---|---|---|
| $T_o$ | $T_o'$ | $T_n$ | $T_n'$ | $T_{2n}$ | $T_{2n}'$ |
| $T_1$ | $T_{n-1}'$ | $T_{n+1}$ | $T_{2n-1}'$ | | |
| $T_{n-1}$ | $T_1'$ | $T_{2n-1}$ | $T_{n+1}'$ | | |

Thus for the current sample constituting the second of each pair, the appropriate previous sample is the sample constituting the first of the same pair. It will be seen in each case that one of the samples is as much ahead of the 0° position of the U-component as the other sample is behind it.

If $n = 4$ or 5 it is also possible to make the following pairs:

| | | | |
|---|---|---|---|
| $T_2$ | $T_{n-2}'$ | $T_{n+2}$ | $T_{2n-2}'$ |
| $T_{n-2}$ | $T_2'$ | $T_{2n-2}$ | $T_{n+2}'$ |

Further pairs can be derived for $n > 5$.

In some cases it may be seen that a shorter distance between corresponding points in the picture will be obtained by changing the previous sample in the first line to one $n$ samples earlier or later. For example, with $n = 3$ it may be seen from FIG. 1 that samples at $T_{n+1}$ $T_{n-1}'$ would provide an alternative to samples at $T_1$ $T_{n-1}'$ and would be preferred since the shorter distance between the corresponding picture points would give a higher probability that the samples would be closely equal.

Thus the previous sample is not a constant number of samples ahead of the current sample, but successive samples are obtained in sequence which are the following number of samples ahead:

For $n = 3$; N, N−1, N−2, N etc

For $n = 4$; N, N−2, N etc

For $n = 5$; N, N−3, N−1, N+1, N−2, N etc

In each case N is an integer divisible by $n$ and the delay of exactly N samples is appropriate for samples taken at times $T_0'$, $T_n'$. N is chosen so that a delay of N samples is approximately equal to one line period.

Figure 2:
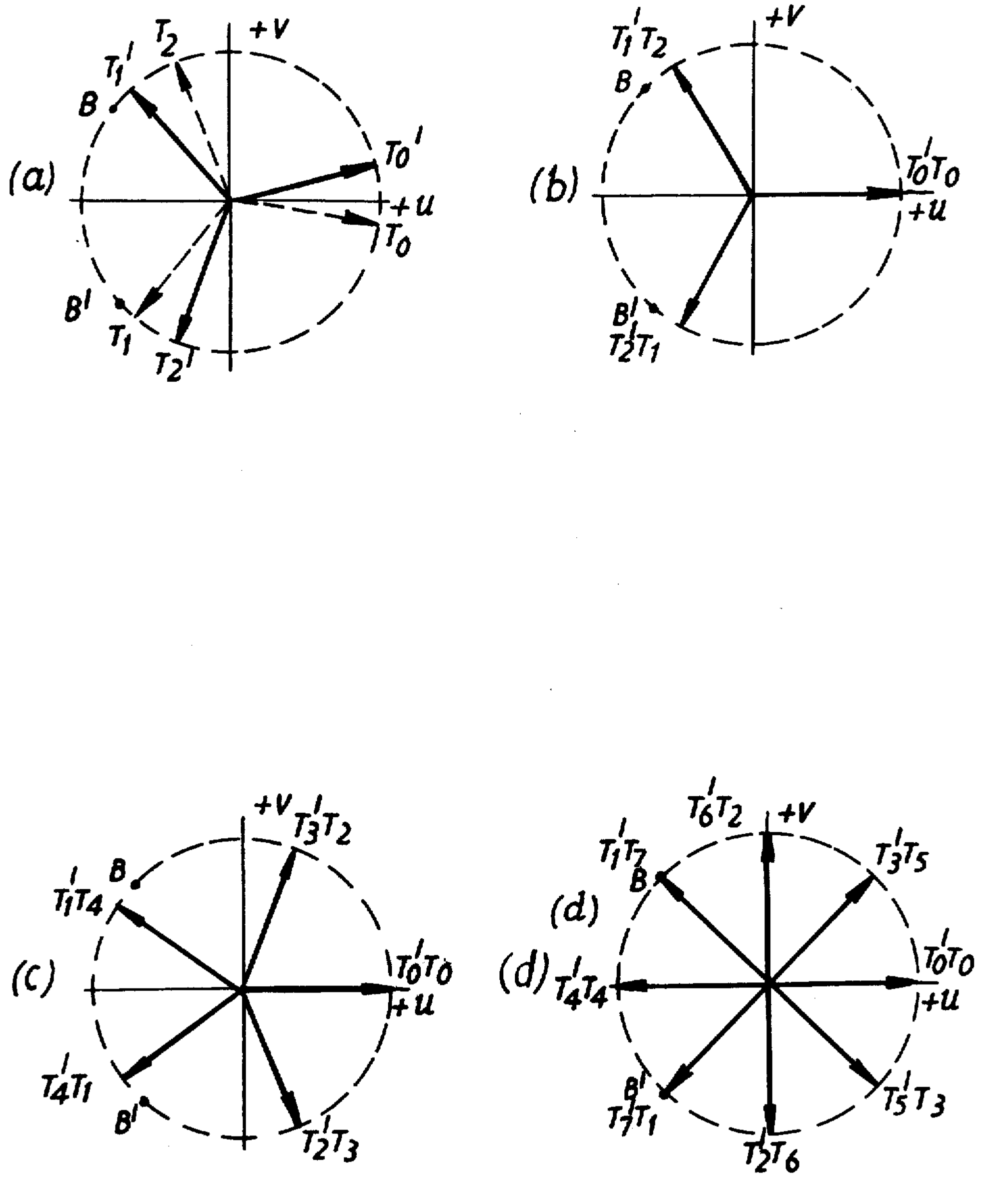

The required phase relation of the sampling instants to the subcarrier phase is illustrated in FIG. 2. At (*a*) is shown the phase of the sampling instants for a sampling rate of three times the subcarrier frequency and for the general case, where there is no special phase relation between the subcarrier and sampling instants. The sampling instants on one line are shown in full lines and are referred to as $T_0'$, $T_1'$ and $T_2'$. The sampling instants for the preceding line will, on account of the reversal of the V-axis modulation, have been taken at the instants $T_0$, $T_1$ and $T_2$ shown in dashed lines. For the current line the phase of the colour burst signal is B' and for the preceding line it is B. However, if the sampling instants are phased as shown at (*b*), that is they are distributed symmetrically above and below the U-axis, then the samples from the preceding line can be used as reference samples for the current line.

The system can be extended for use with a sampling rate which is $n/m$ times the subcarrier frequency, where $n$ and $m$ are both small integers greater than 1. The operation is essentially as described above, but the complete cycle of sample selection will extend over $m$ times the subcarrier period instead of one period.

The required sampling phases for the ratios 5:2 and 8:3 are shown respectively at (*c*) and (*d*) in FIG. 2.

A signal sampled in this way has the property that there are a large number of samples nearby on the same line, or nearby lines and nearby fields, which are taken at the same instantaneous subcarrier phase as any given sample. One, or a combination of these (such as a weighted sum), can be used as a reference for differential encoding, or for partly differential encoding such as described in British Pat. Specification No. 1,289,015, or as a prediction for substitution to conceal probable errors such as described in British Patent application No. 3618/71, now British Pat. Specification No. 1,313,832.

In particular a co-phased sample from the preceding line can always be found within $\pm m/2$ subcarrier cycles ($\pm n/2$ sample periods) of the horizontal co-ordinate of a sample. Alternatively, the mean of the sample n samples before, i.e., to the left of the present sample and the co-phased sample on the previous line next to the right of the present sample may be used as a prediction, or as a reference. Co-phased samples from nearby lines on previous fields, or from the same line of preceding pictures, may be used singly or in combination for these purposes.

The sampled signals have the property that they are easily combined one with another in processes such as cutting, fading, mixing, inlay and overlay by simple operations on several parallel data streams, to give a result with this same property. Signals sampled in arbitrary phase, although at the same frequency would in general require to be brought to a common standard by a translation process involving filtering of sampled data and other arithmetic operations, to avoid a discontinuity in the subcarrier phase or in the output clock pulses.

The sampled signals can easily be generated directly from luminance Y and colour difference U and V signals, or from the colour separation signals R, G and B, as only n different (and themselves related) linear combinations of the three signals need to be formed in sequence to give the equivalent of the sampled encoded signals. Conversely the Y, U and V signals can readily be derived from a composite sampled signal, with a good approximation.

The samples of a PAL signal may be reordered locally within lines to form a signal of the N.T.S.C. type. If an N.T.S.C. signal is sampled symmetrically about the B-Y axis its samples can be similarly reordered to form a signal of the PAL type. Similar operations can be effected between PAL and SECAM signals.

Often two or more samples from nearby points of the field or previous fields are applied to an interpolator for picture processing, such as aperture correction, or synthesis of picture samples of another scanning standard (standards conversion). Signals sampled as described above are especially useful in such processing.

In the circuit of FIG. 3, an input terminal 10 receives samples of a PAL television signal which it applies to a clocked store 12 having N-2 stages. Each stage may consist of an analogue storage element of the so-called bucket-brigade type, or may comprise a number of parallel digital shift register stages. The output of the store 12 is applied to the three contacts of a rotary switch 14 or an electronic equivalent directly over line 16, through a single stage clocked store 18, and through a two-stage clocked store 20 respectively. As the switch 14 rotates the output 22 therefore provides samples which are N, N−1 and N−2 samples ahead of the current sample. The stores 12, 18 and 20 are clocked by clock pulses from a clock pulse generator 24. The clock pulse generator and the switch 14 both receive signals at subcarrier frequency from a source 26.

The required phase relation between the samples and the subcarrier can be obtained by using a phase-locked loop responsive to the colour burst. The burst provides sufficient information on the phase and switch sense of the PAL colour subcarrier, and a simple modification of a conventional burst-locked oscillator can be employed. The colour burst is itself switched in phase about the U-axis and has a constant instantaneous value on every line when sampled along this axis. Any departure from this constant value between pairs of lines can be used as an error signal for the control loop, in a polarity determined by the PAL switch sense.

For cases when $n$ is an integral multiple of 4, at least some of the samples may be taken at zero-crossings, maxima and minima of the burst, see FIG. 2 at (*d*), for example. In this case a simpler method of setting the required phase relation can be employed. If it is required to set the phase of the sampling in an analogue-to-digital converter, the sampling within the converter itself can form part of the control loop.

In application to error concealment the previous sample on output 22 in FIG. 3 is switched to take the place of the current sample whenever indication of an error is obtained (for example by carrier dropout in f.m. transmission or video tape recording systems, or a parity check digit in a pulse-code modulation system). In application to differential p.c.m. transmission similar arrangements exist at the transmitting and receiving terminals to derive the previous sample, and the difference between the current sample and the previous sample is taken, transmitted and used to obtain the current sample at the receiving end by adding it to the previous sample. The method can be employed in advanced forms of d.p.c.m. or partially-differential p.c.m. which require, for at least some of the values transmitted, a reference to a previous sample value or combination of previous sample values to code and decode the current value.

We claim:

1. A method of sampling and encoding a PAL colour television signal in pulse form, wherein the sampling rate is related to the colour subcarrier frequency by a ratio of small integers, comprising the steps of providing simultaneously with a current sample a previous sample from a corresponding part of a preceding line for which the V-component of the chrominance signal has a relatively reversed phase, the previous sample being that prevailing at an instant which is separated in time from the maxima and minima of the U-component by an amount equal in amplitude but opposite in sense to the corresponding separation for the current sample, and differentially encoding the current sample by reference to the previous sample.

2. A method of sampling and encoding a PAL colour television signal in pulse form, wherein the sampling rate is related to the colour subcarrier frequency by a ratio of small integers, comprising the steps of providing simultaneously with a current sample a combination of previous samples each from a corresponding part of a previous line for which the V-component of the chrominance signal has a relatively reversed phase, the previous samples being those prevailing at instants which are separated in time from the maxima and minima of the U-component by an amount equal in amplitude but opposite in sense to the corresponding separation for the current sample, and differentially encoding the current sample by reference to the combined sample.

3. A method of concealing errors in a PAL colour television signal sampled in pulse form, wherein the sampling rate is related to the colour subcarrier frequency by a ratio of small integers, comprising the steps of providing simultaneously with a current sample a previous sample from a corresponding part of a preceding line for which the V-component of the chrominance signal has a relatively reversed phase, the previous sample being that prevailing at an instant which is separated in time from the maxima and minima of the U-component by an amount equal in amplitude but opposite in sense to the corresponding separation for the current sample, and when an error is detected replacing the current sample by the previous sample.

4. A method of concealing errors in a PAL colour television signal sampled in pulse form, wherein the sampling rate is related to the colour subcarrier frequency by a ratio of small integers, comprising the steps of providing simultaneously with a current sample a combination of previous samples each from a corresponding part of a previous line for which the V-component of the chrominance signal has a relatively reversed phase, the previous samples being those prevailing at instants which are separated in time from the maxima and minima of the U-component by an amount equal in amplitude but opposite in sense to the corresponding separation for the current sample, and when an error is detected replacing the current sample by the combined sample.

5. Apparatus for processing PAL colour television signals in pulse form, wherein the sampling rate is related to the colour subcarrier frequency by a ratio of small integers, said apparatus comprising means for providing simultaneously with a current sample a previous sample from a corresponding part of a preceding line for which the V-component of the chrominance signal has a relatively reversed phase, said means being adapted to provide a previous sample which is prevailing at an instant which is separated in time from the maxima and minima of the U-component by an amount equal in amplitude but opposite in sense to the corresponding separation for the current sample.

6. Apparatus as claimed in claim 5, wherein said means comprises clocked storage means and a commutator for selecting in turn the outputs of the last three stages of the clocked storage means.

7. A method of sampling a PAL colour television signal, said method comprising the steps of:

sampling a PAL colour television signal at a sampling rate which bears a ratio of small integers to the frequency of the colour subcarrier; and simultaneously maintaining sampling instants at points symmetrically disposed in time about the maxima and minima of the U-component of the signal sampled.

8. A method as claimed in claim 7, wherein the sampling rate is three times the colour subcarrier frequency, and the sampling instants are maintained at either the 0°, 120° and 240° positions or the 60°, 180° and 300° positions relative to the U-axis.

9. A method of converting a PAL colour television signal to an N.T.S.C. signal, comprising sampling said PAL signal at a sampling rate which bears a ratio of small integers to the colour subcarrier frequency, the sampling instants being symmetrically disposed about the phase of the B-Y component of the PAL signal, and re-ordering the samples with a subcarrier phase sequence such as to provide a signal of N.T.S.C. form.

10. A method of generating a PAL colour television signal from an N.T.S.C. signal, comprising sampling the N.T.S.C. signal at a sampling rate which bears a ratio of small integers to the colour subcarrier frequency, the sampling instants being symmetrically disposed about the phase of the B-Y component of the N.T.S.C. signal, and re-ordering the samples with a subcarrier phase sequence such as to provide a signal of PAL form.

* * * * *